UNITED STATES PATENT OFFICE.

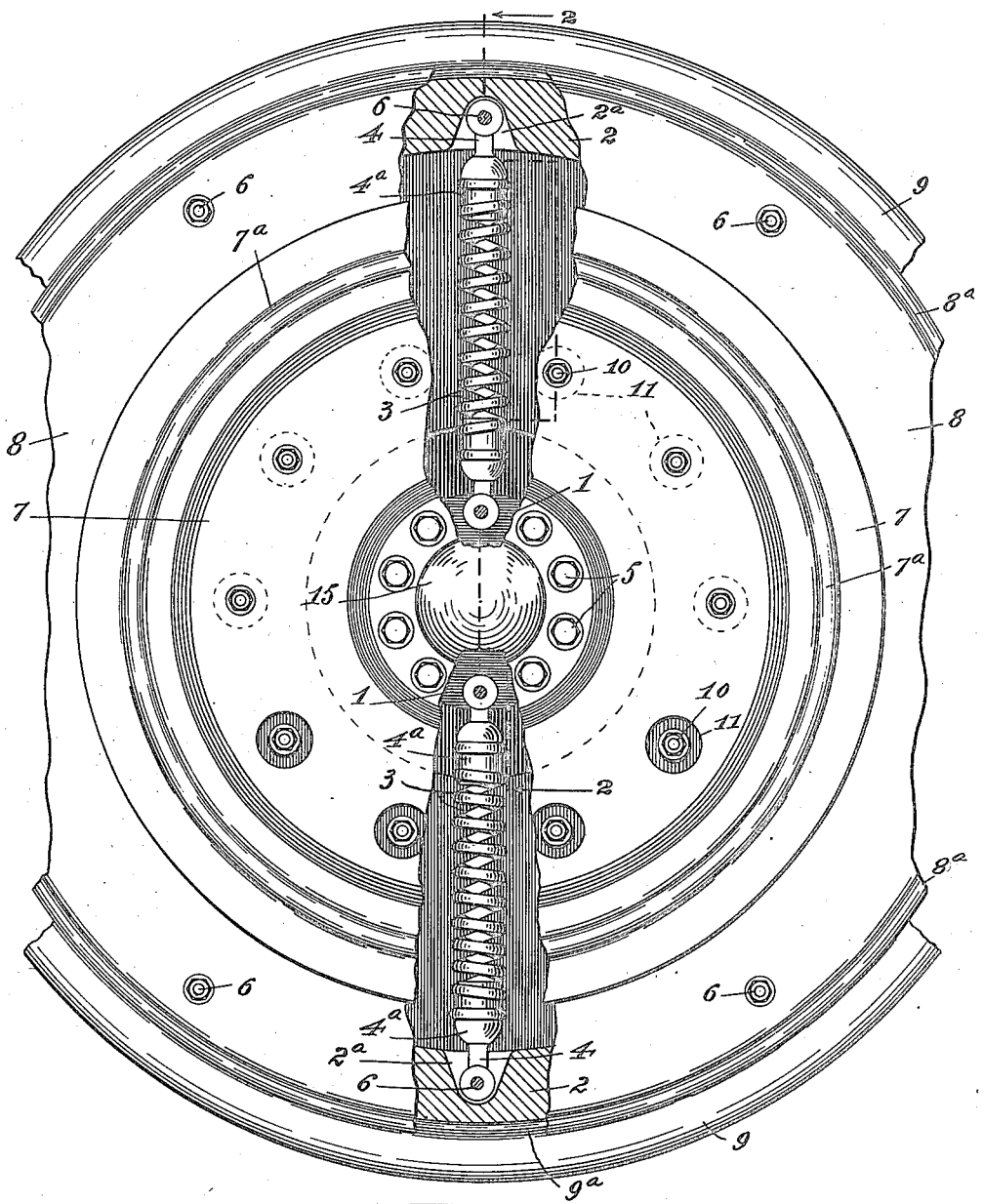

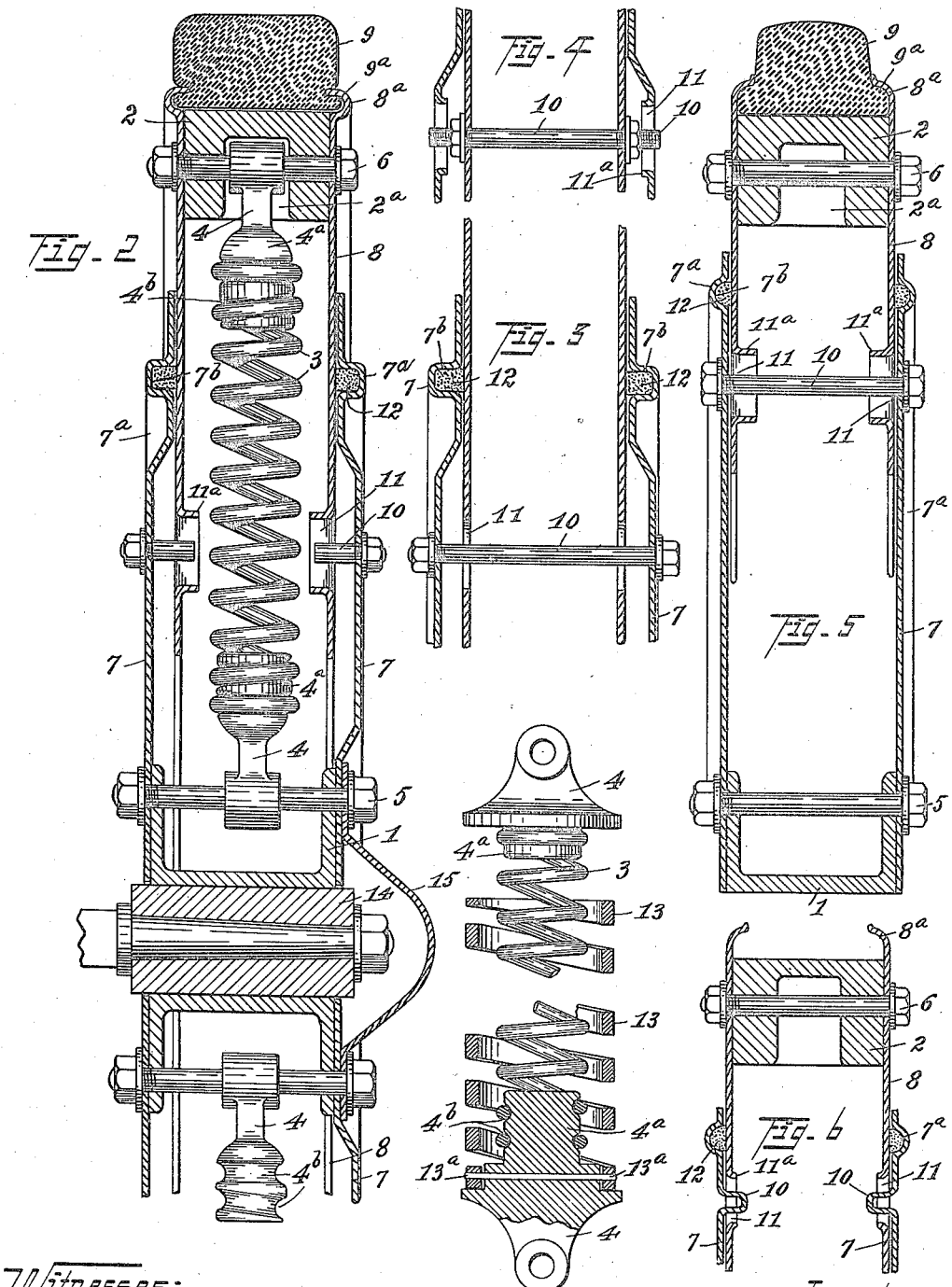

GEORGE W. REDBURN AND CHRISTIAN HEILRATH, OF SACRAMENTO, CALIFORNIA.

RESILIENT VEHICLE-WHEEL.

1,253,280.

Specification of Letters Patent.   Patented Jan. 15, 1918.

Application filed December 2, 1915.   Serial No. 64,665.

*To all whom it may concern:*

Be it known that we, GEORGE W. REDBURN and CHRISTIAN HEILRATH, citizens of the United States, residing at Sacramento, in the county of Sacramento and State of California, have invented certain new and useful Improvements in Resilient Vehicle-Wheels, of which the following is a specification.

Our invention relates to improvements in resilient vehicle wheels, the invention being designed as a substitute for and an improvement on wheels depending for their resiliency on pneumatic and other resilient tires, the primary object of the invention being to provide a generally improved resilient wheel embodying the advantages of and eliminating the objections to pneumatic tires, as well as objections now found to resilient vehicle wheels heretofore designed.

The invention in its primary embodiment comprises hub and felly members connected to and movable relative to each other by means of a connecting spring, said hub and felly members being each provided with a pair of axially and circumferentially movable hub and felly plates, in the present instance in the form of disk plates, inclosing said springs and overlapping each other intermediate said hub and felly members.

As a means of limiting or controlling the axial and circumferential movements of the hub and felly members and the disk plates carried thereby, said plates are provided with stop mechanism, in the present instance, located in the overlapping portions of said hub and felly plates, and comprising, in the present instance, stop members or projections on the overlapping portions of one plate extending into and having a limited radial and circumferential movement in suitable stop openings arranged in the overlapping portions of the other or adjacent plate.

A still further object is the provision of improved means of assembling and disassembling the parts for the purpose of facilitating the replacement of parts when worn or broken, as well as the provision of improved bearings whereby the parts are properly braced during the relative movements of the parts in the practical operation of the improved wheel, the improved wheel also having its parts so arranged and disposed relative to each other as to provide a generally improved wheel of great strength and stability having the requisite resiliency desired in this class of wheels.

A still further object is the provision of improved hub and felly connecting springs together with improved means of pivotally mounting and connecting the ends of said springs to the hub and felly portions of the wheel.

A still further object is the provision of an improved hub and felly connecting spring embodying suitable spring connecting bearing members pivotally connected to the hub and felly portions and comprising a coiled spring connected to such bearing members and adapted to operate at all times, and a second compression spring connected to one of said spring connecting or bearing members and adapted to be brought into engagement with the opposite spring connecting bearing member under predetermined loads or impulses not ordinarily sustained by the first mentioned spring, the latter being adapted to sustain light loads while the compression springs are in the nature of auxiliary springs adapted to be brought into action in sustaining heavy loads as in the case of heavily loaded trucks and other motor vehicles.

With the above mentioned and other ends in view, the invention consists in the novel construction, arrangement, and combination of parts, hereinafter described, illustrated in some of its embodiments in the accompanying drawings, and particularly pointed out in the appended claims.

Referring to the drawings forming a part of this specification, Figure 1, is a fragmentary side elevation of a wheel constructed in accordance with this invention, certain portions being broken away for the purpose of clearer illustration of the parts.

Fig. 2, an enlarged central cross sectional view taken on line 2—2 of Fig. 1.

Fig. 3, a similar view of the overlapping portions of the hub and felly disk plates showing a modified form of stop mechanism for limiting the relative axial and circumferential movements thereof, the hub and felly connecting springs being removed.

Fig. 4, a similar view of a further modified form of such stop mechanism.

Fig. 5, a similar view of a still further modified form of wheel.

Fig. 6, a similar view of a further form or modification of stop mechanism.

Fig. 7, a view of a modified form of hub and felly connecting springs, this form including a second or auxiliary compression spring adapted to be brought into action under certain predetermined loads.

Similar numerals of reference designate like parts throughout all the figures of the drawings.

The improved resilient vehicle wheel comprises suitable hub and felly members 1 and 2, respectively, resiliently connected and movable relative to each other by means of suitable hub and felly connecting springs 3, the latter, in the present instance, being in the form of coiled springs having their ends pivotally connected to the hub and felly members 1 and 2, by means of spring connecting bearing members 4, the latter being provided with spring attaching lugs 4ª, provided with spirally arranged grooves 4ᵇ, adapted to receive and contain the adjacent convolutions of the ends of the springs 3.

The hub and felly members 1 and 2, may be of any convenient form or shape, and as a convenient means of connecting the bearing members 4, of the springs 3, suitable transversely extending hub and felly bolts 5 and 6, respectively, are provided, said bolts 5 and 6, being arranged at suitable intervals, and in the present instance, forming bearings for the spring connecting bearing members 4, and as a means of receiving or forming pockets for the bearing members 4, in connection with the felly member 2, the latter is provided about its inner periphery with suitable recesses or pockets 2ª.

As a means of movably connecting and bracing the hub and felly members 1 and 2, as well as providing for a limited axial and circumferential movement of the same, as hereinafter explained, the hub and felly members 1 and 2, are each provided with a pair of hub and felly disk plates 7 and 8, respectively, extending toward and overlapping each other intermediate the hub and felly members, said disk plates 7 and 8, being secured, in the present instance, by means of the hub and felly bolts 5 and 6, forming bearings for the bearing members 4, of the springs as hereinbefore described.

The outer peripheries of the felly disk plates 8, are preferably provided with tire securing members 8ª, the latter being preferably in the form of hooked or clencher portions 8ˣ, as shown adapted to removably receive and contain the heel portions 9ª, of the tire 9, the latter, in the present instance, being of the solid or resilient type.

As a means of limiting or controlling the axial and circumferential movements of the hub and felly members together with the disk plates 7 and 8, carried thereby, suitable stop mechanism is provided, said stop mechanism, in the present instance, comprising suitable stop members or projections 10, on the overlapping portion of one plate extending into and having a limited movement in suitable stop openings or recesses 11, arranged in the adjacent or overlapping or abutting portion of the other plate.

The stop members 10, may either take the form of inwardly extending stud bolts on the hub disk plate 7, as shown in the upper portion of Fig. 1 of the drawings, and in Fig. 2, or such stop members may comprise transversely extending bolts extending through and connecting the hub disk plates 7, as shown in Figs. 3 and 5 of the drawings, in which instance, the stop bolts 10, will serve the additional function of adjustably connecting and regulating the tension of the overlapping portions of the hub plates 7, on the felly plates 8, or if desired, the stop members 10, may comprise bolts extending transversely through the felly plates 8, as shown in the lower portion of Fig. 1 of the drawings, and in Fig. 4 of the drawings, in which instance the openings or recesses 11, are in the outer or hub plates 7, and only the outwardly projecting ends of the bolt members extend into the openings or recesses 11. Furthermore, if desired, the stop members 10, may take the form of inwardly extending projections or studs pressed inwardly out of the overlapping portions of the hub disk plates 7, as shown in Fig. 6 of the drawings.

As a means of reinforcing the openings 11, the latter are preferably provided with inwardly extending annular flanges 11ª, said flanges acting to form a proper stop surface for the stop members 10, and as a means of forming a convenient friction bearing surface or joint between the adjacent or overlapping portions of the hub and felly disk plates 7 and 8, the hub disk plates 7, are provided with annular ribs 7ª, forming annular recesses 7ᵇ, for receiving and containing a similarly shaped annular packing or filling 12, and such filling or packing 12, may be provided with a suitable lubricant for the friction bearing surfaces of the plates 7 and 8.

In Fig. 7 of the drawings, a modified form of resilient hub and felly connecting device is shown, and it will be understood that such form of hub and felly connecting device or member is adapted for use in lieu of or as a substitute for the connecting springs 3, and it will also be observed that in this modification the connecting spring 3, is supplemented by a second or auxiliary coiled compression spring 13, the latter being connected to one of the spring connecting bearing members 4, in a suitable manner, as by means of a cross bolt 13ª, the other end of the compression spring 13, being adapted to engage with the opposite spring connecting bearing member 4, when the latter is depressed the requisite distance in accordance with a predetermined load or stress in coöperating with the main spring 3, in taking up and sustaining certain predetermined loads or impulses in the practical operation of the wheel.

It should also be understood that the connecting springs 3, may be arranged in the form of either compression or suspension springs or as combined compression and suspension springs, as desired.

If desired, the hub member 1, may be suitably secured upon a suitable hub box 14, and the outer hub disk plate 7, may be provided with a suitable hub cap 15.

From the foregoing description, taken in connection with the accompanying drawings, the operation and advantages of our invention will be readily understood.

Having thus described our invention, what we claim and desire to secure by Letters Patent, is,—

1. A resilient vehicle wheel, comprising hub and felly members, disk plates detachably arranged in pairs at the sides of said hub and felly members and extending toward and overlapping each other between said members, transverse bearing bolts extending through and removably connecting said disk plates to said hub and felly members, and tension and compression springs pivotally and detachably mounted on said bearing bolts said compression springs being adapted to take up and be compressed by predetermined loads.

2. In a resilient vehicle wheel, a resilient hub and felly connecting member comprising a tension and compression spring provided at its ends with detachable pivot bearing members, and a compression spring attached to one of said bearing members and extending outside of said spring and adapted to engage with the other pivot bearing member when the latter is compressed to a pre-determined point by pre-determined loads.

In testimony whereof we have affixed our signatures in the presence of two witnesses.

GEORGE W. REDBURN.
CHRISTIAN HEILRATH.

Witnesses:
W. BAKER,
J. A. CONWAY.